(12) United States Patent
Pouliot et al.

(10) Patent No.: US 7,980,608 B2
(45) Date of Patent: Jul. 19, 2011

(54) APPARATUS FOR MOVING AN OBJECT

(76) Inventors: Lynne Pouliot, St-Valère (CA);
Jean-Marc Pouliot, St-Valère (CA)

( * ) Notice: Subject to any disclaimer, the term of this patent is extended or adjusted under 35 U.S.C. 154(b) by 394 days.

(21) Appl. No.: 12/232,111

(22) Filed: Sep. 11, 2008

(65) Prior Publication Data

US 2010/0060021 A1    Mar. 11, 2010

(51) Int. Cl.
*B65G 7/00* (2006.01)
(52) U.S. Cl. .......................................... 294/15; 294/19.1
(58) Field of Classification Search ................. 294/15, 294/26, 19.1, 24, 168
See application file for complete search history.

(56) References Cited

U.S. PATENT DOCUMENTS

| | | | |
|---|---|---|---|
| 1,428,285 A * | 9/1922 | Herbert | 224/267 |
| 4,113,160 A | 9/1978 | Spiers | |
| 4,135,655 A * | 1/1979 | Brown | 294/166 |
| 4,166,638 A * | 9/1979 | De Prado | 280/638 |
| D287,219 S | 12/1986 | Smith | |
| D302,234 S | 7/1989 | McNamee et al. | |
| D349,437 S | 8/1994 | Mock et al. | |
| 5,405,177 A * | 4/1995 | Goldstein | 294/19.1 |
| D423,309 S * | 4/2000 | Sirmans | D8/14 |
| 6,186,566 B1 | 2/2001 | Frederickson | |
| 6,270,133 B1 * | 8/2001 | Babcock | 294/15 |
| 6,478,352 B1 | 11/2002 | Frederickson | |
| 6,520,555 B1 | 2/2003 | Hamm | |
| 7,490,880 B1 * | 2/2009 | Matsui | 294/19.1 |
| 7,673,912 B2 * | 3/2010 | Breininger | 294/19.1 |
| 2007/0018467 A1 * | 1/2007 | Schwartz | 294/19.1 |

* cited by examiner

*Primary Examiner* — Dean J Kramer
(74) *Attorney, Agent, or Firm* — Equinox Protection; Franz Bonsang, Patent Agent

(57) ABSTRACT

An apparatus for moving an object has a contact plate, a first member connected to the contact plate and extending radially away therefrom, and a second member connected to the first member and slidable relative thereto along an axis defined therewith. The contact plate is sized and shaped for abuttingly extending against a portion of the object and a ground surface when the members are disposed between the ground surface and the object. The second member is slidable between a retracted configuration and an extended configuration to facilitate sliding and storage of the members underneath the object and for subsequent pulling on the members in a desired direction to cause the contact plate in abutment to cause the object to move in the desired direction.

19 Claims, 2 Drawing Sheets

APPARATUS FOR MOVING AN OBJECT

FIELD OF THE INVENTION

The present invention relates to an apparatus for moving an object, and is more particularly directed to an apparatus for dragging an object across a surface.

BACKGROUND OF THE INVENTION

Apparatuses for moving objects along a surface, by dragging the object thereon, are well known in the art. For example, one such apparatus may consist of a belt or cables attached or connected to the object, which are then pulled or to drag the object along the surface. Unfortunately, connecting the cables or belts to the object may often prove difficult, especially when the object has no means for connecting the cables thereto. For example, refrigerators or other major appliances often have smooth surfaces without holes or sockets therein to which the belts may be attached. Alternatively, one may surround the object with the belts and pull the belts to drag the object along the surface. However, placement of the straps to surround the object may be cumbersome, especially for larger objects such as appliances. Another solution is to place a contact plate connected to the member abuttingly against a portion of the object on a first side thereof, extend a belt connected to the plate between the unit and the surface to a second side of the object. By pulling the member, with the plate abutting against the first side, in a direction oriented away from the first side, the object can be dragged across the surface. However, unfortunately, extension of the member beneath the object may prove difficult, especially for larger objects. Further, it may be difficult to maintain the plate in contact with the object. Further, the plate may damage the surface while the object is being dragged thereon.

Accordingly, there is a need for an improved apparatus for moving an object.

SUMMARY OF THE INVENTION

It is therefore a general object of the present invention to provide an improved apparatus for moving an object.

An advantage of the present invention is that the apparatus is easily adjustable for moving objects of different sizes.

Another advantage of the present invention is that the apparatus may be easily placed underneath the object.

A further advantage of the present invention is that the apparatus is extensible.

Still another advantage of the present invention is that the apparatus is easily maintained in contact with the object during movement of the object therewith.

Another advantage of the present invention is that the apparatus may be used with minimal risk of damage to the surface upon which the object is disposed.

According to a first aspect of the present invention, there is provided an apparatus for dragging an object along a ground surface, the apparatus comprising:
 a contact plate having a lower plate edge and a generally opposed upper plate edge, and defining a contact plane thereof;
 a first elongated member connected to the first plate and extending away therefrom in a direction substantially perpendicular to the contact plane; and
 a second elongated member connected to the first member and slidable relative thereto along an axis defined therewith in opposed first and second directions between for respectively extending and retracting the second member between a retracted configuration in which the second member is substantially in an overlying relationship relative to the first member and an extended configuration in which the second member is slidably and axially extended outwardly away from the first member in an end-to-end relationship relative thereto, the contact plate being sized and shaped for contact abutment of the upper plate edge against a portion of the object with the generally opposed lower plate edge abutting the ground surface when the members are moved in the first direction to cause the object to be dragged on the surface in the first direction.

Other objects and advantages of the present invention will become apparent from a careful reading of the detailed description provided herein, with appropriate reference to the accompanying drawings.

BRIEF DESCRIPTION OF THE DRAWINGS

Further aspects and advantages of the present invention will become better understood with reference to the description in association with the following Figures, in which similar references used in different Figures denote similar components, wherein.

DETAILED DESCRIPTION OF THE PREFERRED EMBODIMENTS

With reference to the annexed drawings the preferred embodiments of the present invention will be herein described for indicative purpose and by no means as of limitation.

Figure 1:
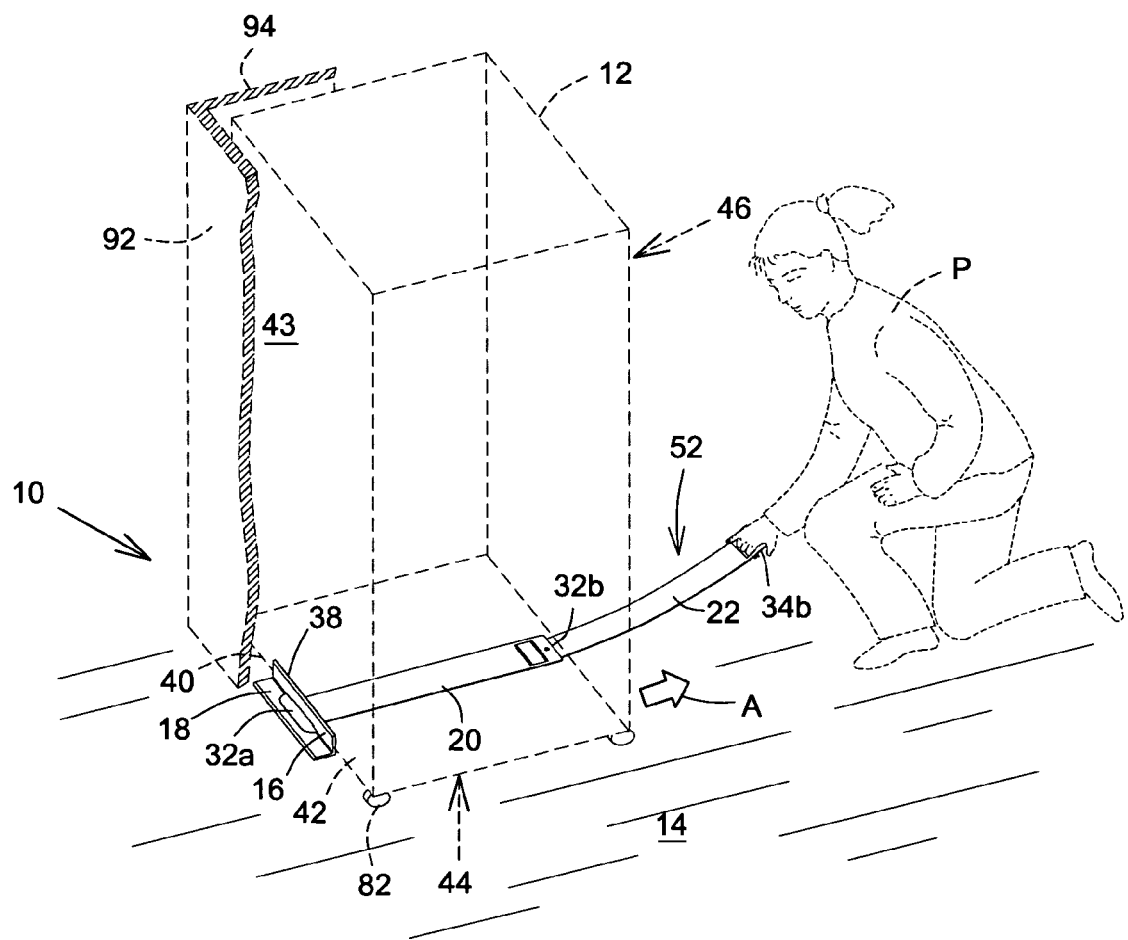
FIG. 1 is a top perspective view of an embodiment of an apparatus for moving an object in accordance with the present invention, the apparatus being shown in an extended configuration.
Figure 2:
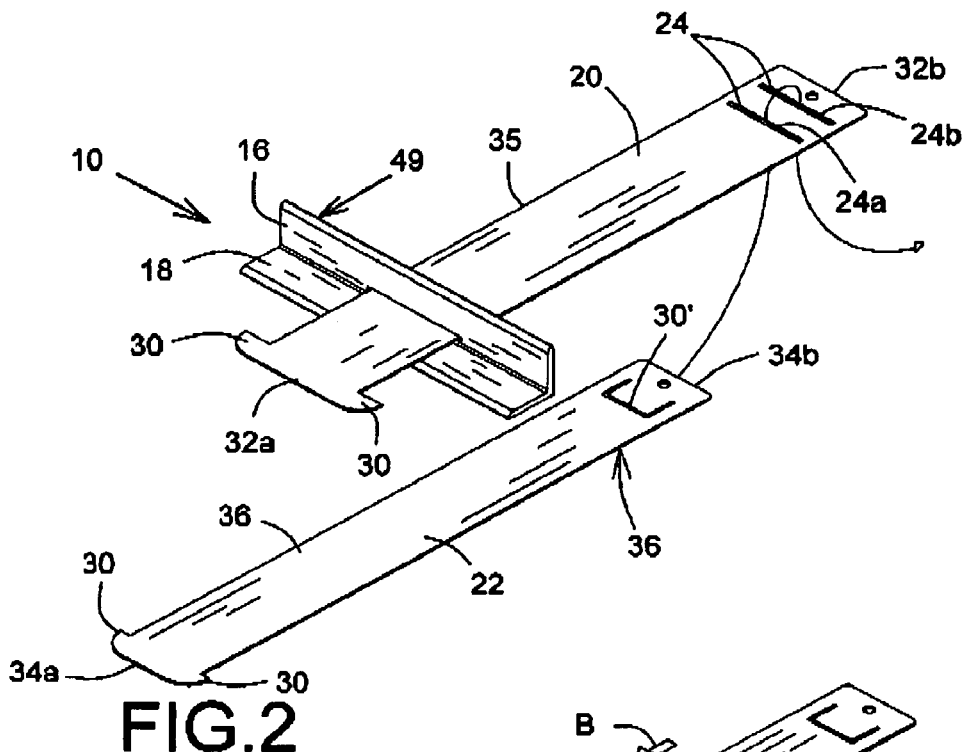
FIG. 2 is an exploded view of the apparatus shown in FIG. 1.
Figure 3:
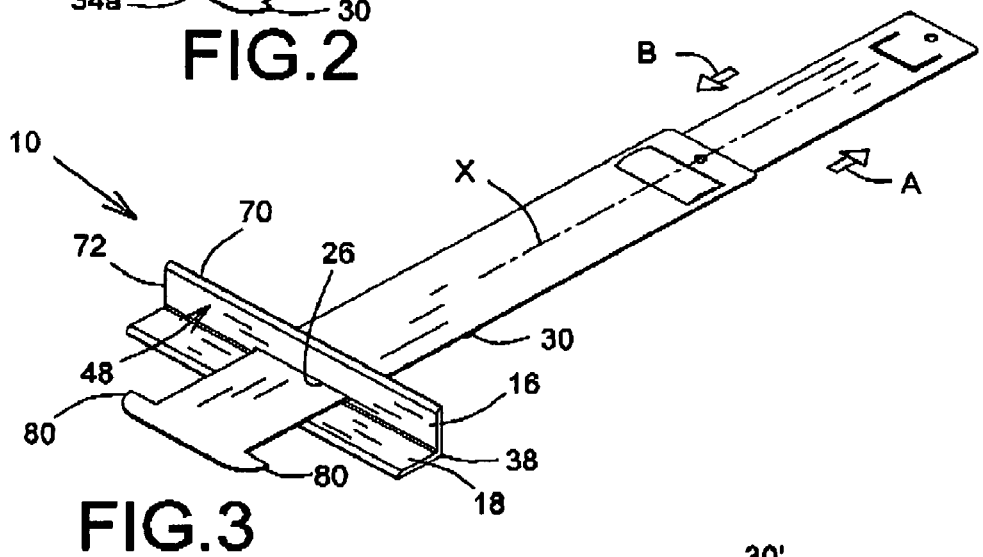
FIG. 3 is another perspective view of the apparatus shown in FIG. 1, showing sliding movement of members of the apparatus.
Figure 4:
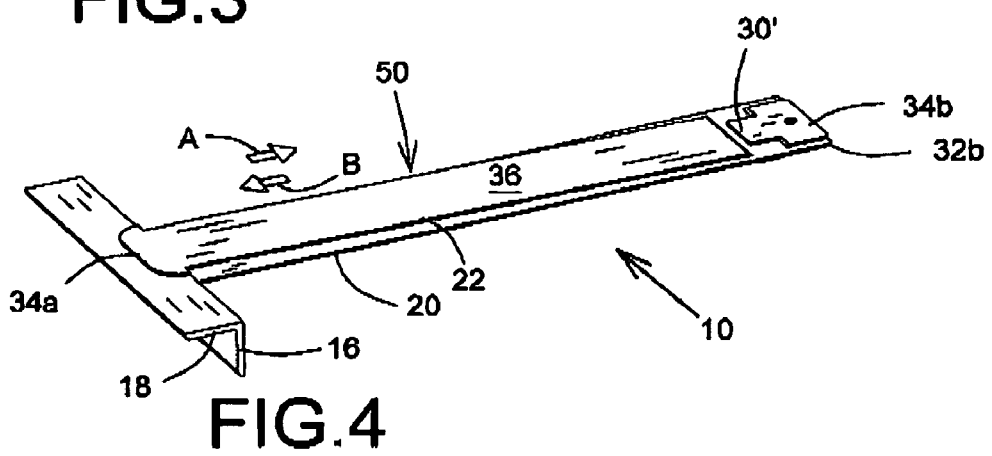
FIG. 4 is a side view of the apparatus shown in FIG. 1, showing the apparatus in a retracted configuration.

Referring to FIGS. 1 to 4, there is shown an embodiment of an apparatus, shown generally as 10, for dragging an object 12 on a ground surface 14. Broadly speaking, the apparatus 10 has a first, vertical contact plate 16, an optional second horizontal guide or support plate 18 connected to the contact plate 16, a first elongated member 20 connected to the contact plate 16, and a second elongated member 22 connected to the first member 20. The second member 22 is slidable relative the first member 20 along an axis X defined therewith between a retracted configuration, shown generally as 50, and an extended configuration, shown generally as 52. In the retracted configuration 50, the second member 22 is substantially overlaid by the first member 20 in an overlying configuration relative thereto, whereas in the extended configuration 52, the second member 22 extends substantially axially away from the first member 20 in an end-to-end configuration relative thereto. Thus, and with reference to arrows showing directions A and B, the second member 22 is slidably extendable in direction A towards the extended configuration 52, and is slidably retractable in opposite direction B towards the retracted configuration 50. The contact plate 16 is sized and shaped for overlapping and abutting against a portion, or proximal face, 42 of the object 12 as the members 20, 22 are moved in the first direction A away from the portion 42 to cause the object to be dragged on the surface 14 in direction A. Thus, the apparatus 10 may be positioned with the contact plate 16 proximal the portion 42 and the members 20, 22 extending away therefrom in direction A for extension of the second member 22 into the extended configuration 52 alongside or under the object 12 such that the second member 22 extends at least as far, and preferably beyond, on an opposing side or face 46 opposite the contact portion 42. The object 12 can then be dragged in direction A across the surface 14 by pulling the members 20, 22, and more specifically the second member 22, in direction A.

As shown, the object 12 may be any type of object 12 which is conventionally moved across the surface 14 by dragging there along. For example, the object 12 could be a box, furniture, or an appliance such as a refrigerator, stove, dishwasher, clothes washer, clothes dryer, air conditioner, furnace, or the like. The surface 14 is preferably a ground surface 14, such as a floor, carpet, or the ground. Preferably, and as shown, the members 20, 22 are substantially equal in length and are preferably made of strong, resilient and flexible material such as a flexible plastic or the like. If desired, the object 12 may be an object having wheels 82 or being supported on wheels 82 on the surface 14 for facilitating movement of the object there along.

Referring now to FIGS. 1 through 4, the first member 20 is, preferably movably (could also be fixedly connected to or extend therefrom), connected to the contact plate 16 by, preferably slidable, mounting of the first member 20 in or through a plate aperture 26, preferably extending horizontally proximal a horizontally extending lower plate edge 38 of the contact plate 16 (could also be fixedly connected to the plate 16 or extend substantially perpendicularly therefrom). Further, the plate aperture 26 is preferably centrally situated in the plate 16, i.e. centrally between plate vertical plate sides 72 between which the lower plate edge 38 and generally opposed upper plate edge 70 extend. More specifically, the first member 20 has longitudinally opposed first and second ends 32a, 32b and extends through the plate aperture 26, the member 16 and plate aperture 26 being sized and shaped such that the member 20 may freely, yet abuttingly or snuggly, slide through the aperture 26 without wobbling of the member 20. Thus, the width and breadth of the plate aperture 26 and first member 20 are substantially the same with the aperture 26 serving as a guide slot 26 through which the member 20 may be slid back and forth in directions A and B to, respectively, slidingly extend and retract the first member 20 relative the plates 16, 18. A blocking means 30, shown as wings or flaps 30 protruding outwardly at the first end 32a on both member sides 35 thereof, prevents the first end 32a from passing through the plate aperture 26. The flaps 30 preferably have rounded outer edges 80.

The first member 20 also has at least one member aperture 24, preferably spaced-apart first and second member slots or apertures 24a, 24b, disposed proximal the second end 32b, and through which the second member 22 is slidably mounted or threaded. As with the first member 20, the second member 22 and the member apertures 24 are sized and shaped such that the second member 22 may freely, yet abuttingly or snuggly slide through the member apertures 24 without wobbling of the member 22, the width and breadth of the aperture 24 and member 22 being substantially the same. Thus, the member apertures 24 serve as guide slots 24 for the second member 22, through which the second member 22 can be slidably retracted and extended relative the first member 20. Accordingly, in use, the first member 20 slidably overlays the second member 22. Preferably, the members 20, 22 are of similar length such that the first member 20 almost completely overlays the second member 22 in the retracted configuration 50.

The second member 22 has first and second longitudinally opposed extremities 34a, 34b and has a respective blocking means 30 disposed proximal the first extremity 34a that prevents the first extremity 34a from passing through the apertures 24, 26. The second extremity 34b has also has a blocking means 30', for example a hook or flange 30'. The flange 30' extends radially from one member face 36 of the second member 22, away from the first member 20, for preventing the second extremity 34b from passing through the member apertures 24. Accordingly, sliding movement of the second member 22 relative the first member 20 is only possible within a range extending between the extremities 34, and in particular blocking means 30, 30', of the second member 22. Similarly, the blocking means 30 of the first member 20 and the second member 22 ensure that sliding movement of the first member 22 or the plates 16, 18 relative one another is generally limited to a range extending between the blocking means 30 at first end 32a and the innermost member aperture 24 at the second end 32b. Thus, for the embodiment shown, when the second member 22 is in the retracted configuration 50, the first extremity 34a is preferably situated adjacently proximal the first end 32a and the second end 32b is situated adjacently proximal the second extremity 34b. Conversely, when the second member 22 is in the extended configuration 52, the first extremity 34a is preferably situated proximal the second end 32b of the first member 20 with the blocking means 30 of the second member 22 preventing further movement of the second member in direction A, the second extremity 34b disposed comparatively distal the second end 32b.

As the first member 22 is connected proximal the lower plate edge 38 of the contact plate 16, the contact plate 16 is disposed vertically upwardly relative the members 20, 22, extending vertically upwards along vertical plate sides 72 to upper plate edge 70, when the lower plate edge 38 is disposed on the ground surface 14. The contact plate 16 is configured, i.e. sized and shaped, such that it may be positioned in abutment with at least a portion of the object 12, with the members 20, 22 extending away from the portion 42 in the first direction A substantially perpendicular to the portion 42. Thus, the contact plate 16 could be positioned extending over an edge 40 of the object 12 and an adjacent portion 42 of a first face 43 thereof, with the members 20, 22 extending in the first direction A alongside or parallel an adjacent face 44 of the object 12 disposed adjacent and substantially perpendicular to the first face 43. For example, the contact plate 16 could be positioned in abutment with, or extending overlapping with, a lower object edge 40 and a portion 42 of a first face 43 of the object 12. In such case, the members 20, 22 could be extended under the object 12 along the adjacent bottom face 44 in the first direction A, generally away from the edge 40, face 43, and portion 42 such that at least one of the members 20, 22, and notably the second member 22 in the extended configuration 52, extends beyond a second opposing face 46, disposed adjacent the adjacent face 44 and opposite the first face 43. A user P may then simply apply a force in the first direction A to the members 20, 22, for example pulling the members 20, 22 in the direction A, to cause the object 12, pulled by the motion of the members 20, 22 and the contact plate 16 abutting against the edge 40 and portion 42, to be moved along the surface 14 in the direction A. Ideally; to ensure that the contact plate 18 does not become disengaged from the edge 40 and the portion 42 of the first face 43, as well as to facilitate positioning of the contact plate 18 in overlapping abutment with the edge 40 and the portion 42 of the first face 43, the contact plate 16 is sized and shaped such that when the members 20, 22 are extended between the bottom face 44 and the ground surface 14 with the lower plate edge 38 laying on the ground surface 14, the contact plate 16, and specifically the upper plate edge 70 extends beyond and vertically overlaps the lower object edge 40, thus ensuring that as the apparatus 12 is moved in the first direction A, the contact plate 16 will be moved into abutting overlapping contact with the lower object edge 40 and adjacent portion 42 of adjacent face 44.

Preferably, the optional support plate 18 extends along and outwardly from the lower plate edge 38 substantially perpendicular to a contact plane defined by the contact plate 18, preferably oppositely away from the direction A in which the both members 20, 22 may be extended. Thus, when the apparatus 10 is in use the support plate 18 extends away from the object 12. For example, and as shown, the support plate 18 preferably extends perpendicularly outwardly from a first plate side 48 of the contact plate 16 which is generally opposite a second plate side 49 thereof which abuts the object 12 and which is proximal the second member 22. Advantageously, the support plate 18 is configured, i.e. sized and shaped, along with the contact plate 16 such that when the support plate 18 rests on the ground surface 14, the contact plate 16 extends beyond, i.e. overlaps, the lower object edge 40. At the same time, the support plate 18, is further sized and shaped to extend sufficiently far away from the contact plate 16 that when the contact plate 16 abuts the edge 40 and adjacent portion 42 of the object 12 with the lower plate edge 38 and support plate 18 on the ground surface 14, the support plate 18 will prevent the contact plate 16 from being disengaged from the edge 40 and adjacent portion 42 as the apparatus is pulled in direction A. For uses where the members 20, 22 must be fit between the bottom face 44 of the object 12 and between the ground surface 14, the members 20, 22 are configured, i.e. sized and shaped to be fit between the bottom edge 40, bottom surface 44 and the ground surface 14. Preferably, and to this end, the members 20, 22 are substantially flat.

Preferably, the contact plate 16 and support plate 18 are made of a strong, rigid material, for example a rigid plastic, to ensure that the plates 16, 18 will not bend or break due to the force placed thereon by moving the members 20, 22 in the first direction A to move the object 12. Preferably, the plates 16, 18 also smooth and non-abrasive, so as to minimize risks of scratches or the like to the surface 14 or object 12. Additionally, if desired, the first member 20 may be fixedly connected to the contact plate 16 in a fixed position, such that the member 20 is not slidably extendable and retractable relative thereto.

In use, the apparatus 10' is initially placed near the object 12, for example an appliance such as a refrigerator, with the members 20, 22 extending theretowards in the desired direction A, and the support plate 18 and lower edge 38 disposed on the ground surface 14 with the remainder of the contact plate 20 extending vertically upwardly therefrom, vertically beyond the lower object edge 40 of the object 12. Thus, the members 20, 22 extend toward, and possibly beyond, the lower object edge 40 of the first face 43 of the object 12, whereas the support plate 18 extends away from the lower object edge 40. The user P then pulls at least one of the members 20, 22, and preferably the second member 22, towards direction A under the object 12 until at least one of the members 20, 22, and preferably the second member 22 drawn into the extended configuration 52, extends beyond the opposing second face 46 and the contact plate 16 is drawn into overlapping abutment with the adjacent portion 52 of the first face 40 adjacent the lower edge 40 thereof. The user P may then continue to pull the member 20, 22 in direction A with the contact plate 16 abutting the adjacent portion 42 of the first face 40 to drag the object in direction A along the ground surface 14 with the support plate 18 sliding along the ground surface 14 and preventing the contact plate 16 from becoming separated or otherwise disengaged from the lower edge 40 and portion 42. In this fashion, movement of the object 12 along surface 14 is facilitated, even for users P having minimal physical strength.

It is possible that the first and second members 20, 22, when the second member 22 is in the retracted configuration 50, are insufficient to extend completely under the object 12, from the first face 43 beyond the second opposing face 46. In such cases, to move the object 12 in direction A, the user P simply pulls the second member 22 towards, or completely into, the extended configuration 52 until the members 20, 22 are sufficiently extended that the members 20, 22 can be extended below the object 12 with the contact plate 16, 18 spaced apart or abutting the first face 44 and the second extremity 34b extending beyond the second face 46. The user P then proceeds as previously described to move the object 12 in the desired direction A. It may be desirable to fully extend the second member 22 even when the first member 20 and the second member 22 in the retracted configuration 50, are sufficient to extend completely under the object 12 between the faces 43, 46, as the additional length provided by the second member 22 in the extended configuration 52 may be convenient for moving the object 12. This could notably be the case where the user P wishes to pull the second member 22 upward, facilitated by the flexible nature of the members 20, 22, while moving the object 12 in direction A. For example, the user P may wish to pull the members 20, 22 and object 12 in direction A while the user P is in a substantially kneeling down position, shown in FIG. 1, in which the user P kneels with one knee on the ground surface 14 and then pulls the members 20, 22 in direction A, the members 20, 22 and notably second member 22, gently arcing upwards as the user P pulls.

Once the apparatus 10 is placed with the contact plate 18 in overlapping abutment against the adjacent portion 42 of the first face 43 with the members 20, 22 extending underneath the adjacent bottom surface 22, the object 12 and apparatus 10 can also be moved in the second direction B, simply by pushing the object 10 in the second direction B. In such case, due to the abutment of the object against the adjacent portion 42 of the first face 43, the apparatus is dragged along with the object in direction B until the object is in a desired position, for example with the first face 43 proximally adjacent and facing a rear wall 92, as is often the case with appliances. The second member 22 may then be pushed towards the second direction B to move the second member 22 towards, and into, the retracted configuration 50 to at least partially, and preferably completely, store the members 20, 22 underneath the bottom surface 44 with the second extremity 34a proximal the second face 46 and readily graspable by the user P. Thus, the second extremity 34a can be easily grasped for subsequent pulling in direction A to move the object in direction A, as may be required in the future. The ability to store the members 20, 22 underneath the object 12 and to move the object 12 in directions A and B will be back and forth along with the apparatus is particularly useful when the object 12 is positioned with face against or proximal to rear wall 92 and situated laterally adjacent or between one or more side walls 94.

If required, since the first member 20 is flexible and may be moved in the second direction through the plate aperture 24, both members 20, 22 can be further moved in second direction B, should the members 20, 22 continue to protrude beyond the bottom surface 46 once the object is in the desired position and the second member 22 is in the retracted configuration 52. However, any such further movement in the second direction B may be limited by abutment of the first extremity 34a of second member 22 against the contact plate 20. Also, moving the first member 20 in the second direction B through the plate aperture 24 may result in the first end 32a undesirably extending outwardly below the bottom surface 46 and beyond the first face 43. Further, if the first face 32 is situated proximally adjacent and facing a wall 92 or other barrier, collision of the first end 32a of the member 20 may encumber further movement in the first direction. Accordingly, the first member 20 is preferably sized and shaped such that when the contact plate 16 is immediately proximal to the adjacent portion 42 of object 12 or abutting thereagainst and the blocking means 30 of the first member 20 is abutting against the contact plate 16, the second end 32b of the first member 12 and second extremity 34b is disposed beneath the bottom adjacent surface 44, preferably proximal the second face 46 without extending therebeyond. The second member 22 is also, ideally, sized and shaped such that, in the retracted configuration 52, the second extremity 34a is disposed underneath the adjacent bottom surface 32 but immediately proximal the second face 46 of the object 12. Thus, the first member 20 and second member 22 in the retracted configuration 50 can be conveniently stored, for example when the apparatus 10 is not in use, completely underneath the object 20, proximal the second face 46 without extending therebeyond.

Although the present apparatus 10 has been described with a certain degree of particularity, it is to be understood that the disclosure has been made by way of example only and that the present invention is not limited to the features of the embodiments described and illustrated herein, but includes all variations and modifications within the scope and spirit of the invention as hereinafter claimed.

We claim:

1. An apparatus for dragging an object along a ground surface, the apparatus comprising:
    a contact plate having a lower plate edge and a generally opposed upper plate edge, and defining a contact plane thereof;
    a first elongated member connected to the contact plate and extending away therefrom in a direction substantially perpendicular to the contact plane
    a second elongated member connected to the first member and slidable relative thereto along an axis defined therewith in opposed first and second directions between for respectively extending and retracting said second member a retracted configuration in which said second member is substantially in an overlying relationship relative to said first member and an extended configuration in which said second member is slidably and axially extended outwardly away from said first member in an end-to-end relationship relative thereto, said contact plate being sized and shaped for contact abutment of said upper plate edge against a portion of the object with said generally opposed lower plate edge abutting said ground surface when said members are moved in said first direction to cause the object to be dragged on said surface in said first direction; and
    a support plate extending substantially perpendicularly to said contact plane in said second direction in proximity to said lower plate edge for contacting said around surface when said contact plate is in abutting contact with said portion for maintaining said contact plate abutting theremainst while said object is being moved on said ground surface in said first direction.

2. The apparatus of claim 1, wherein said first and said second members are sized and shaped for passage beneath the object.

3. The apparatus of claim 1, wherein said first and said second members are substantially flat.

4. The apparatus of claim 1, wherein said contact plate comprises a plate aperture extending therethrough, said first member extending through said plate aperture.

5. The apparatus of claim 4, wherein said member plate aperture is situated proximal said lower plate edge.

6. The apparatus if claim 4, wherein said first member is slidable back and forth along said axis through said plate aperture.

7. The apparatus of claim 4, wherein said first member has a first end and a longitudinally opposed second end, said second member being slidably connected to said second end and said first end extending though said plate aperture, said first end having a respective blocking means therefor disposed thereon for blocking passage of said first end through said plate aperture.

8. The apparatus of claim 7, wherein said second end has at least one member aperture through which said second member slidably extends.

9. The apparatus of claim 8, wherein said second member has generally opposed first and second extremities, said first extremity having a respective blocking means disposed thereon to block passage of said first extremity through said at least one member aperture.

10. The apparatus of claim 9, wherein said second extremity has a respective blocking means disposed thereon to prevent passage of the second extremity through said second member aperture.

11. The apparatus of claim 9, wherein, in said retracted configuration, said first extremity is disposed proximal said first end and in said extended configuration said first extremity is disposed proximal said second end.

12. The apparatus of claim 8, wherein said at least one member aperture comprises spaced apart first and second member apertures though which said second member slidably extends.

13. The apparatus of claim 1, wherein said first and second members are sized and shaped such that when said second member is in said extended configuration and said contact plate is in contact with said portion said second member extends laterally across said object and beyond a face thereof disposed generally opposite said portion.

14. The apparatus of claim 1, wherein said first and said second members are further sized and shaped such that when said second member is in said retracted configuration and said contact plate is disposed proximal said portion, said first and said second members are disposed beneath a bottom face of the object without extending therebeyond, the second member being disposed proximal a second face disposed opposite said portion for subsequent grasping by the user to pull the first and second members in said first direction for subsequent dragging of the object in said first direction.

15. The apparatus of claim 1, wherein said first and second members are of substantially the same length.

16. The apparatus of claim 1, wherein said contact plate is substantially rectangular in shape.

17. The apparatus of claim 1, wherein said contact plate and said support plate are substantially smooth and non abrasive.

18. An apparatus for dragging an object along a around surface, the apparatus comprising:

a contact plate having a lower plate edge and a generally opposed upper plate edge, and defining a contact plane thereof:
a first elongated member connected to the contact state and extending away therefrom in a direction substantially perpendicular to the contact plane; and
a second elongated member connected to the first member and slidable relative thereto along an axis defined therewith in opposed first and second directions for respectively extending and retracting said second member between a retracted configuration in which said second member is substantially in an overlying relationship relative to said first member and an extended configuration in which said second member is slidably and axially extended outwardly away from said first member in an end-to-end relationship relative thereto, said contact plate being sized and shaped for contact abutment of said upper plate edge against a portion of the object with said generally opposed lower plate edge abutting said ground surface when said members are moved in said first direction to cause the object to be dragged on said surface in said first direction, at least one of said first and second members are made of a resilient and flexible material.

19. An apparatus for dragging an object along a ground surface, the apparatus comprising:

a contact plate a lower plate edge and a generally opposed upper plate edge, and defining a contact plane thereof;
a first elongated member being slidably connect through the contact plate and extending away therefrom in a direction substantially perpendicular to the contact plane; and
a second elongated member connected to the first member and slidable relative thereto along an axis defined therewith in opposed first and second directions for respectively extending and retracting said second member between a retracted configuration in which said second member is substantially in an overlying relationship relative to said first member and an extended configuration in which said second member is slidably and axially extended outwardly away from said first member in an end-to-end relationship relative thereto, said contact plate being sized and shaped for contact abutment of said upper plate edge against a portion of the object with said generally opposed lower plate edge abutting said ground surface when said members are moved in said first direction to cause the object to be dragged on said surface in said first direction.

\* \* \* \* \*